United States Patent [19]
Lunden

[11] 3,908,834
[45] Sept. 30, 1975

[54] GUIDE MEANS FOR LUMBER STACKING MACHINE

[75] Inventor: Sidney L. Lunden, Spokane, Wash.

[73] Assignee: Moore-Iem, Inc., Spokane, Wash.

[22] Filed: Apr. 1, 1974

[21] Appl. No.: 456,754

[52] U.S. Cl. ............................................. 214/6 DK
[51] Int. Cl.² .................... B65G 57/10; B65G 57/20
[58] Field of Search ................. 214/6 DK, 6 H, 6 M

[56] References Cited
UNITED STATES PATENTS

| | | | |
|---|---|---|---|
| 3,610,443 | 10/1971 | Brumunddal | 214/6 DK |
| 3,737,052 | 6/1973 | Lunden | 214/6 DK |
| 3,743,113 | 7/1973 | Eaton et al. | 214/6 DK |
| 3,760,959 | 9/1973 | Newnes | 214/6 DK |

Primary Examiner—Robert J. Spar
Assistant Examiner—Leslie J. Paperner
Attorney, Agent, or Firm—Wells, St. John & Roberts

[57] ABSTRACT

An improved guide apparatus is disclosed for use with lumber stacking apparatus wherein a course support mechanism on a movable carriage is utilized to: (a) raise end individual course of boards from a course pickup station; (b) move the course forwardly to a course stacking station; (c) lower the course in front of layer stripping members; and (d) strip the course onto the stack as the carriage is moved rearwardly. The improved guide apparatus is operatively connected between the carriage and course support mechanism. It operates in response to an elevating mechanism to guide the course support mechanism upward and rearwardly at the course pickup station and to guide the course support mechanism downward and forwardly at the stacking station. Directional movement affected by the guide apparatus enables the course to reach a fully lowered position in front of the stripping members before the carriage is retracted to strip the course onto the stack.

3 Claims, 4 Drawing Figures

GUIDE MEANS FOR LUMBER STACKING MACHINE

BACKGROUND OF THE INVENTION

The present invention is related to lumber stackers and more particularly to mechanisms for handling successive courses or layers of lumber during the formation of an upright stack.

Some difficulty has been experienced with prior lumber stacking machines having a layer handling support that is utilized to lift successive layers of lumber from a pickup station, move the layer forwardly, and lower the layer to a stacking station, then subsequently retract to strip the layer onto the stack. One difficulty with such carriage structures occurs frequently at the point of reverse direction of the layer handling support as it starts to retract to strip a layer onto the stack. Such structures are designed so the layer handling support is still moving downwardly as the support is retracted. The difficulty, then, arises as the rearward board of the layer engages stripping members as it is simultaneously being moved rearwardly and downwardly. The stripping members are usually stationary upright bars that are designed to halt rearward movement of the layer as the handling means is retracted below. Often, the combined rearward and downward force causes the layer to buckle with the rearward board of the layer flipping upwardly onto the remainder of the layer, hampering formation of a uniform stack.

Several carriage drive mechanisms are disclosed in my U.S. Pat. No. 3,737,052. The disclosure describes carriage drives that provide an advantage of smooth acceleration of the carriage at the beginning and end of an operational stroke. Although this crank drive functions very well, it does not include the further advantage of the present invention wherein provision is made for evenly stripping each layer onto the stack.

One of the principal advantages of this invention is to provide a carriage drive of the crank type in which the layer support is fully lowered before layer stripping begins.

Another object and advantage of this invention is to provide an improved carriage structure that may be adapted to many existing lumber stacking machines without major alterations thereto.

A further object of my invention is to provide such a structure that is very simple in construction, involving few moving parts, and is therefore inexpensive in maintenance and operation.

These and other objects and advantages will become apparent upon reading the following description, which taken with the accompanying drawings, disclose a preferred form of the present invention.

BRIEF DESCRIPTION OF THE DRAWINGS

A preferred form of the present invention is illustrated in the accompanying drawings in which.

DETAILED DESCRIPTION OF A PREFERRED EMBODIMENT

Figure 1:
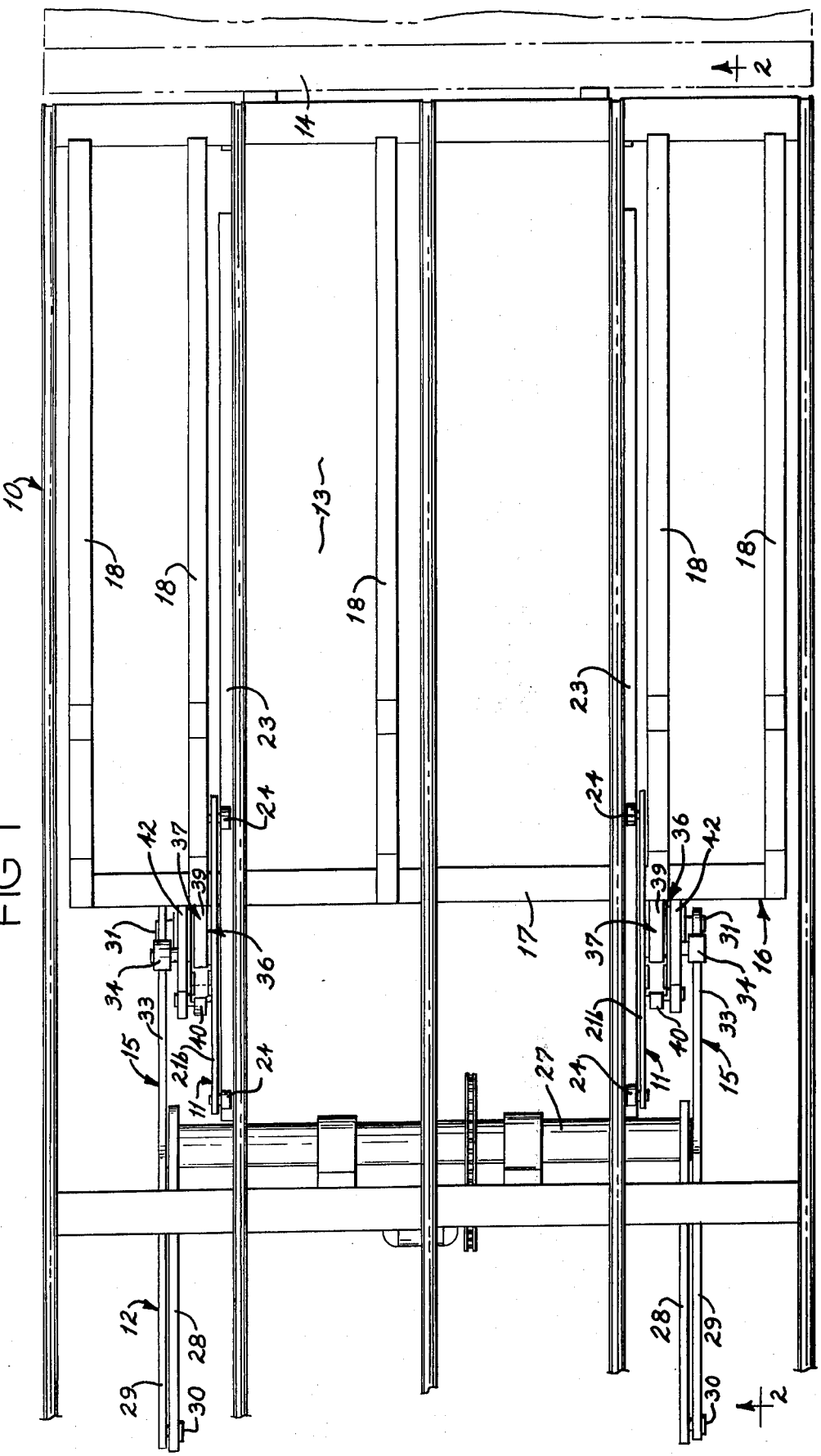
FIG. 1 is a plan view of a stacking machine incorporating the structure of the present invention.

A lumber stacking machine is illustrated in the accompanying drawing and is designated by the reference numeral 10. Stacking machine 10 typically includes a carriage 11 movably mounted on the stacking machine for reciprocating movement in response to a drive means 12. The drive means 12 operates the carriage to move between a pickup station 13 and a stacking station 14. An elevating means 15 is also provided in conjunction with the drive means 12 for raising and lowering a course support means 16. Elevating means 15 is utilized to raise the course support means 16 to engage and lift a course of boards from pickup station 13, hold it elevated as the carriage moves forward, lower the course at the stacking station, and remain in the lowered position as the carriage is retracted so the course is moved against a plurality of stripping members 19 and thereby stripped onto a stack below.

The course support means includes a common cross bar 17 that extends across the width of the stacking machine below the pickup station 13 to support a plurality of fork arms 18. Fork arms 18 extend forward from the bar 17 and are utilized to engage and lift the successive layers from the pickup station.

Carriage 11 is mounted for horizontal movement on the stacking machine framework. Carriage 11 includes a pair of end sections 21 that are T shaped in configuration, each with a leg section 21a depending downwardly. A horizontal leg section 21b includes spaced rollers 24 that are utilized to engage a track 23 extending along the stacking machine framework. The tracks 23 guide the carriage 11 to move in a horizontal path within the confines of the stacking machine framework.

A drive means 12 basically comprises a common crankshaft 27 extending across the width of the stacking machine having crank arms 28 mounted at the ends thereof. The crank arms 28 are operatively connected to carriage 11 by means of connecting links 29. Each link 29 is mounted to an outer end of crank arm 28 by a pivot pin 30, and to the depending leg section 21a of each carriage end section 21 by a wrist pin 31.

A somewhat similar drive means is illustrated in U.S. Pat. No. 3,737,052 granted to me on June 5, 1973. The disclosure of this patent describes in detail the advantage of such an arrangement particularly for evenly accelerating the carriage 11 backward and forwardly. Such disclosure may be helpful in understanding the movement of the carriage and in this regard is incorporated by reference.

The primary concern of the present invention is not particularly directed toward the lumber stacking machine structure and elements described above, but rather a guide means 36 interconnecting the carriage 11 and course support means 16 for controlling movement of the course support means at the pickup station 13 and stacking station 14.

Looking at the improvement in more detail, guide means 36 is shown comprising elongated cams 37. Cams 37 are mounted to end sections 21 of carriage 11 at an inclined angle thereon. The inclination of cams 37 is an important feature of the present invention and will be discussed in greater detail below.

Cams 37 each include opposed cam surfaces 38 and 39 that face rearward and forwardly respectively. A vertically spaced pair of followers 40 and 41 are provided on each of an opposed pair of upright end plates 42 of course support means 16. The upper follower 40 of the two, engages cam surface 38 adjacent an upward cam end thereof and follower 41 engages cam surface 39 adjacent the lower end of the cam. The relative spaced position of the followers 40 and 41 prevent fork arms 18, that are cantilevered forwardly on the bar 17, from tipping downwardly. The followers 40 and 41 further allow upward movement of the support means 16 along the angular path determined by cam surface 38 and 39.

Figure 2:
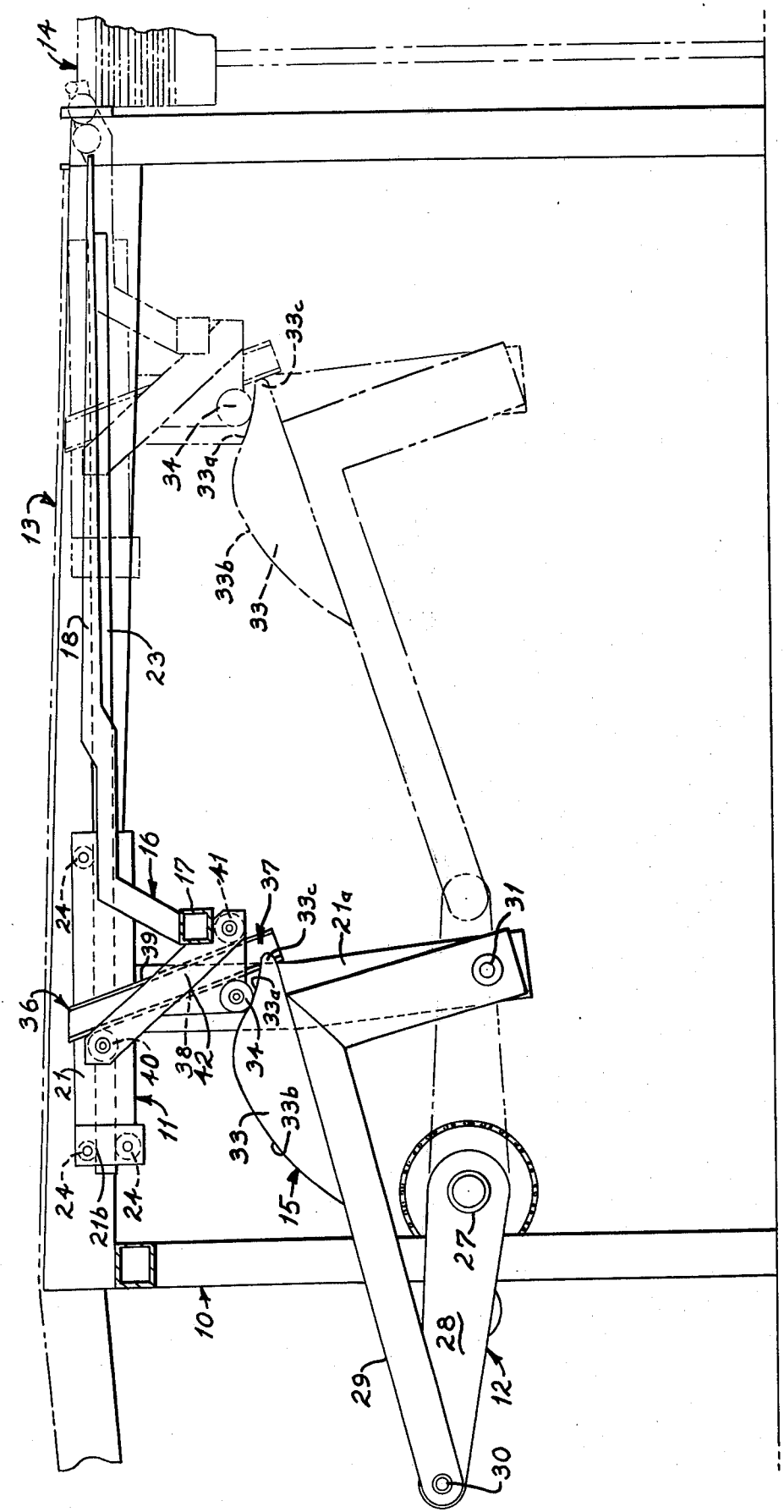
FIG. 2 is an elevational sectioned view taken substantially along line 2—2 in FIG. 1.
Figure 3:
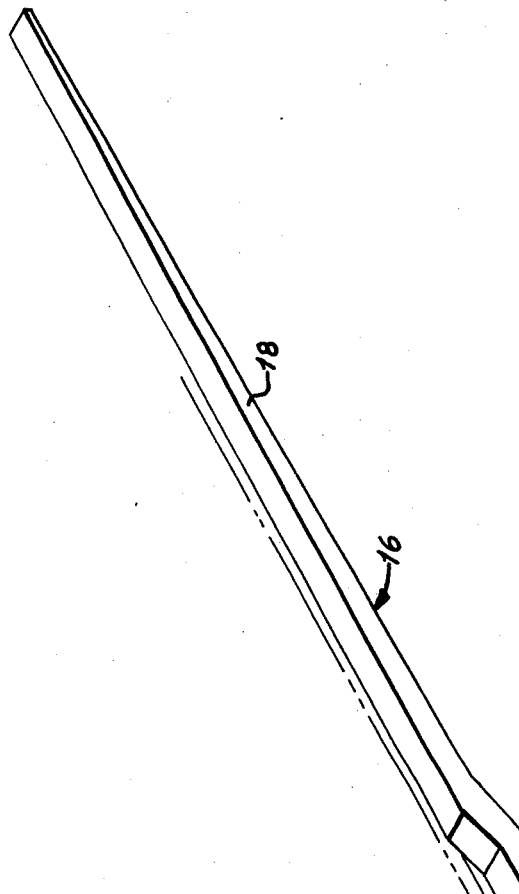
FIG. 3 is a fragmentary pictoral view illustrating basic features of the present invention.

Vertical movement of the support means is accomplished in response to operation of drive means 12 by the elevating means 15 which is comprised of cams 33 mounted to connecting links 29. Followers 34 are provided to engage cams 33, each being rotatably mounted to a plate 42 about a fixed axis. It may be easily understood with reference to FIG. 2 that angular movement of cams 33 about the axes of wrist pins 31 will result in vertical movement of the course support means 16. Cams 33 are designed to engage followers 34 during lifting and lowering portions of the operation of the stacking machine. Since crank arms 28 are rotatable in a circular path, cams 33 are correspondingly oscillated about the axis of wrist pins 31. The cam surfaces are identical, each being designed to include a first section 33a that serves to raise the course support means 16 at the pickup station 13 and to lower the course support means at the stacking station 14. A second section 33b of the cam surface extends along a fixed radius from the wrist pin axis and thereby maintains the support means 16 in the raised position as it is moved forwardly to the stacking station. A forward end section 33c of cam 33 is sharply curved to enable the course support means 16 to remain in a downward position as the crank arm 28 pulls the carriage rearwardly to strip a course presently supported on fork arms 18 onto the stack.

Figure 4:
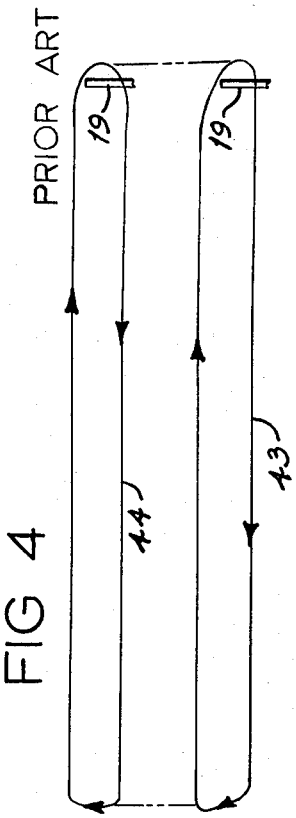
FIG. 4 is a comparative diagram illustrating the path of a point on the carriage of the present invention in relation to the path of a point on a similar carriage utilizing different guide means.

The inclination of cam surfaces 38 and 39 are designed to affect a path of movement of support means 16 as shown in the lower diagram 43 of FIG. 4. The upper diagram 44 of the FIG. is illustrative of the path of travel of a point on course support means 16 when utilizing cam surfaces 38 and 39 that are vertical. The lower diagram 43 illustrates the responding movement of the same point on the course support means 16 upon inclination of the cam surfaces 38 and 39 at an angle of approximately 20°. As may be noted in FIG. 4 by phantom lines at either end of the diagrams, the path of travel, when inclined cam surfaces are utilized, is slightly longer then the path of travel utilizing upright cam surfaces. This effect is realized as the crank arm 28 initiates a forward stoke. At this time there is very little forward movement of the carriage 11 in response to angular rotation of crank arm 28. The cam 33 though, is moved during this period over an angular path corresponding to the angular movement of crank arm 28. This angular movement of cam 33 results in corresponding upward movement of course support means 16. Since the cam surfaces 38 and 39 are inclined rearwardly, the carriage is initially moved slightly rearward and upwardly before the angular displacement of crank arm 28 becomes such that the carriage is driven forwardly at a substantially higher velocity.

At the end of the forward stroke, as the crank armk 28 and connecting link 29 reach a dead center position (illustrated by phantom lines in FIG. 2) the carriage is allowed to lower, bringing the course or layer supported on fork arms 18 closely adjacent to the top surface of the stack. Again, at this position, there is a substantial amount of angular movement of crank arm 28 before the carriage reaches any significant rearward linear velocity. Therefore, as the carriage slowly comes to a halt during its forward movement and subsequently starts to slowly retract, the course support means 16 is lowered along cam surface 33a to bring the fork arms 18 into close proximity of the stack and to move the course held thereon in front of the stripping members 19.

The inclination of cam surfaces 38 and 39 enable the course support means 16 to be moved slightly forwardly while being lowered. The forward end of diagram 43 illustrates this movement in comparison with diagram 44 wherein the downward movement of the course support means describes a semi-elliptical path. The path of movement the inclined cam surfaces affect is an extremely important feature of my invention since they allow the course support means 16 to be substantially completely lowered before the carriage is retracted. As a result, the course of boards held by fork arms 18 is moved rearwardly in the linear path before abutting the course stripping members 19.

As may be noted from the diagram 44, the support means 16 is still continuing its downward movement as the course of boards comes into abutment with the stripping members 19. This often causes some difficulty since the combined rearward and downward movement of the fork arms 18, in relation to the stationary stripping members 19, often cause the rearward board of the course to be flipped upwardly or otherwise disoriented from the remainder of the course. With the retraction of course support means along a linear rearward path, the above problem is not encountered to any substantial extent.

It may have become obvious from the above description and attached drawings that various changes and modifications may be made therein without departing from the intended scope of my invention. For example, the present carriage structure may be easily incorporated with stacking machines such as that disclosed in my pending application Ser. No. 382,740 filed on July 26, 1973 wherein a sticker placement device is described for utilization on a somewhat similar stacking machine arrangement that incorporates a parallelogram-type linkage by which the fork arms are raised and lowered in response to angular movement of a cam on a connecting link. Therefore, only the following claims are to be taken as definitions of the present invention.

What I claim is:

1. In a lumber stacking apparatus including a crank drive means for reciprocating a carriage in forward and rearward strokes between a course pickup station and a course stacking station and elevating means for vertically moving a course support means on the carriage to (a) raise a course of boards at the course pickup station, (b) lower the course in front of layer stripping members and (c) maintain the lowered condition as the carriage is moved rearwardly to strip the course onto a stack, an improvement comprising:

guide means interconnecting the course support means and the carriage for guiding the course support means upward and rearwardly, with respect to the carriage at the course pickup station as the elevating means raises the course support means and for guiding the course support means downward and forwardly at the stacking station as the elevating means lowers the course support means; wherein the guide means includes (1) opposed parallel planar cam surfaces and is mounted to the carriage so the cam surfaces face forward and rearward, the cam surfaces being inclined upward and rearward with respect to a vertical reference plane; and (2) a pair of vertically spaced rollers engaging the respective cam surfaces and mounted to the course support means for rotation about fixed horizontal axes.

2. The improvement set out in claim 1 wherein the angle of inclination of the cam surfaces is sufficient to enable the layer to be completely lowered before the layer is brought into contact with the stripping members.

3. The improvement set out in claim 2 wherein the angle of inclination of the cam surface is 20° rearwardly from the vertical reference plane.

* * * * *